(12) United States Patent
Billiauws et al.

(10) Patent No.: US 10,769,871 B2
(45) Date of Patent: Sep. 8, 2020

(54) METHOD FOR DETERMINING THE WIPING USE OF A WIPER BLADE, AND WIPER SYSTEM

(71) Applicant: Valeo Systèmes d'Essuyage, Le Mesnil Saint Denis (FR)

(72) Inventors: Stijn Billiauws, Saint-Denis (FR); Damien Coquet, Saint-Denis (FR); Olivier Jomard, Issoire (FR); Eric Poton, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 16/335,985

(22) PCT Filed: Aug. 28, 2017

(86) PCT No.: PCT/EP2017/071525
§ 371 (c)(1),
(2) Date: Mar. 22, 2019

(87) PCT Pub. No.: WO2018/059848
PCT Pub. Date: Apr. 5, 2018

(65) Prior Publication Data
US 2020/0027290 A1 Jan. 23, 2020

(30) Foreign Application Priority Data
Sep. 28, 2016 (FR) ...................................... 16 59189

(51) Int. Cl.
*G07C 5/08* (2006.01)
*B60Q 9/00* (2006.01)
(Continued)

(52) U.S. Cl.
CPC ............. *G07C 5/0816* (2013.01); *B60Q 9/00* (2013.01); *B60S 1/08* (2013.01); *B60S 5/00* (2013.01)

(58) Field of Classification Search
CPC ................................................ B60S 2001/3844
See application file for complete search history.

(56) References Cited

U.S. PATENT DOCUMENTS

| | | | |
|---|---|---|---|
| 2014/0088886 A1* | 3/2014 | Dias | B60S 1/0818 |
| | | | 702/34 |
| 2015/0082576 A1* | 3/2015 | Adeline | B60S 1/0452 |
| | | | 15/250.19 |
| 2016/0207500 A1* | 7/2016 | Renke | B60S 1/38 |

FOREIGN PATENT DOCUMENTS

| | | |
|---|---|---|
| EP | 2253520 A2 | 11/2010 |
| EP | 2524845 A1 | 11/2012 |

(Continued)

OTHER PUBLICATIONS

International Search Report and Written Opinion issued in corresponding International Patent Application No. PCT/EP2017/071525, dated Nov. 2, 2017 (10 pages).

*Primary Examiner* — Thomas S McCormack
(74) *Attorney, Agent, or Firm* — Osha Liang LLP

(57) ABSTRACT

The invention relates to a method for determining the wiping use of a wiper blade (14) pertaining to a wiper system (10) used to wipe a window pane (12) of a motor vehicle, with a view to replacing said wiper blade once it exceeds a determined wear threshold, the wiper blade carrier (16) being movable between a position of use, called a service position, and a maintenance position, said method being characterised in that it successively comprises: a step a) of acquiring at least one data element representing the presence of the wiper blade (14) in the maintenance position; a step b) of determining the replacement of the wiper blade with a (Continued)

new wiper blade; and a step (c) of estimating the wiping use of the new wiper blade.

11 Claims, 1 Drawing Sheet

(51) Int. Cl.
*B60S 1/08* (2006.01)
*B60S 5/00* (2006.01)

(56) References Cited

FOREIGN PATENT DOCUMENTS

EP           2851246 A1    3/2015
WO       86/04554 A1    8/1986

\* cited by examiner

METHOD FOR DETERMINING THE WIPING USE OF A WIPER BLADE, AND WIPER SYSTEM

TECHNICAL FIELD OF THE INVENTION

The invention relates to a method for determining the wiping use of a wiper, in particular with a view to replacing it in good time with a fresh wiper, and to a wiping system able to implement such a method.

TECHNICAL BACKGROUND OF THE INVENTION

A wiping system for a window such as a vehicle windshield comprises in particular at least one wiper carried by a wiper carrier and a motor for driving the wiper carrier such that the wiper is driven by the wiper carrier to wipe the windshield back and forth, for example with a cyclical rotational movement, substantially in a circular arc, about an axis of rotation.

In order to be able to carry out various maintenance operations on the wipers, the wiper carrier is movable, in general manually, from a use position, termed "service position", in which a wiper blade of the wiper which the latter carries is in contact with the outer surface of the windshield and is able to be driven by the wiper carrier in order to wipe and/or clean the windshield, to a position, termed "maintenance position", in which the wiper is not in contact with the windshield.

The wiper carrier can be brought into its maintenance position for example to clean the wiper, replace it in the case of wear or protect it from ice formed on the windshield in winter.

Also known is a type of wiping system in which the wiper carrier is in a position, termed stowage position, for example below the hood of the vehicle when the system is inactive.

In this stowage position, the wiper carrier is not accessible and it cannot be brought directly from this stowage position to a maintenance position.

A specific command of the system, from the cabin of the vehicle, makes it possible to move the wiper carrier from its stowage position to an intermediate position in which it is accessible and the wiper which it carries bears on the windshield, as in an aforementioned service position. The wiper carrier can then be moved manually from this intermediate position to a maintenance position in which the wiper is no longer in contact with the windshield.

In order to guarantee the highest degree of use safety of the vehicle and in particular the best visibility conditions through the window, for example through the windshield, it is necessary that each wiper is replaced with a fresh new wiper at the end of a determined wiping use quantity which, for a fresh wiper, corresponds for example to a number of wiping cycles.

It is relatively simple to note the date of change of the wipers and then, starting from a period of installation recommended by the manufacturer, to carry out their replacement with a set of fresh wipers upon expiry of this period. However, such a solution is not satisfactory since it does not correspond to a real knowledge of the actual wiping use of the wiper, which is the main parameter of wear of the wiper, and in particular of its wiper blade.

Accordingly, the invention is aimed in particular at proposing a method which makes it possible, in a reliable manner, to determine the wiping use of a fresh wiper.

BRIEF SUMMARY OF THE INVENTION

The invention proposes a method for determining the wiping use of a wiper of a wiping system for a motor vehicle window, with a view to replacing this wiper once it exceeds a determined use threshold, the system comprising at least one wiper carried by a wiper carrier which is movable from a use position, termed service position, in which the wiper is in contact with an outer surface of the window in order to carry out wiping thereof by sweeping back and forth, to a position, termed maintenance position, in which the wiper is not in contact with said outer surface of the window, which method is characterized in that it successively comprises:

a step a) of acquiring at least one data item which is representative of the presence of the wiper in the maintenance position;

a step b) of determining the replacement of the wiper with a new wiper;

a step c) of estimating the wiping use of the new wiper.

According to other features of the method, which can be taken alone or in combination:

the estimating step c) comprises a substep of comparing the wiping use of the new wiper with respect to a value of a wiping use threshold;

said threshold value is a determined use limit value of a fresh wiper;

the estimating step c) is followed by a step d) of emitting a warning signal when the wiping use of the new wiper is above said wiping use threshold;

said warning signal is an information signal with a view to replacing the used new wiper with another new wiper;

the step b) of determining the replacement of the wiper with a new wiper is a step of emitting an interrogation message destined for a user of the vehicle and/or for a person tasked with the maintenance of the wiper;

said message is a message asking the user of the vehicle and/or the person tasked with the maintenance of the wiper if he or she has replaced the wiper with a fresh new wiper;

said system comprises at least one motor for driving the wiper support to sweep back and forth, and the step b) of determining the replacement of the wiper with a new wiper is a step of measuring the power consumption of said at least one motor during the wiping use of the wiper carried by the wiper carrier;

said step a) of acquiring at least one data item representative of the presence of the wiper in the maintenance position consists in:

i) measuring or estimating at least one parameter for determining the maintenance position or service position;

ii) comparing the measured or estimated value of said parameter with a reference value or a range of reference values; and iii) determining, from the results of the comparison, if the wiper carrier is in the maintenance or service position;

said parameter is chosen from the electrical consumption of at least one motor for driving the wiper carrier to sweep back and forth, the output torque of said motor, the frictional torque of the wiper on the window and the coefficient of friction of the wiper on the window;

the step c) of estimating the wiping use of the new wiper is a step of counting the number of back-and-forth sweeping cycles carried out after said replacement of the wiper with a new wiper.

The invention also proposes a wiping system for a motor vehicle window, comprising:
- at least one wiper carried by a wiper carrier which is movable from a use position, termed service position, in which the wiper is in contact with an outer surface of the window in order to carry out wiping thereof by sweeping back and forth, to a position, termed maintenance position, in which the wiper is not in contact with said outer surface of the window;
- at least one motor for driving the wiper support to sweep back and forth;
- characterized in that the system comprises a device:
- for acquiring at least one data item which is representative of the presence of the wiper in the maintenance position;
- for determining the replacement of the wiper with a new wiper.

BRIEF DESCRIPTION OF THE FIGURES

Other features and advantages of the invention will become apparent on reading the detailed description which will follow and an understanding of which will be gathered with reference to the appended drawing, in which.

DETAILED DESCRIPTION OF THE FIGURES

In the remainder of the description, elements and components having an identical structure or analogous functions will be designated by the same references.

Figure 1:
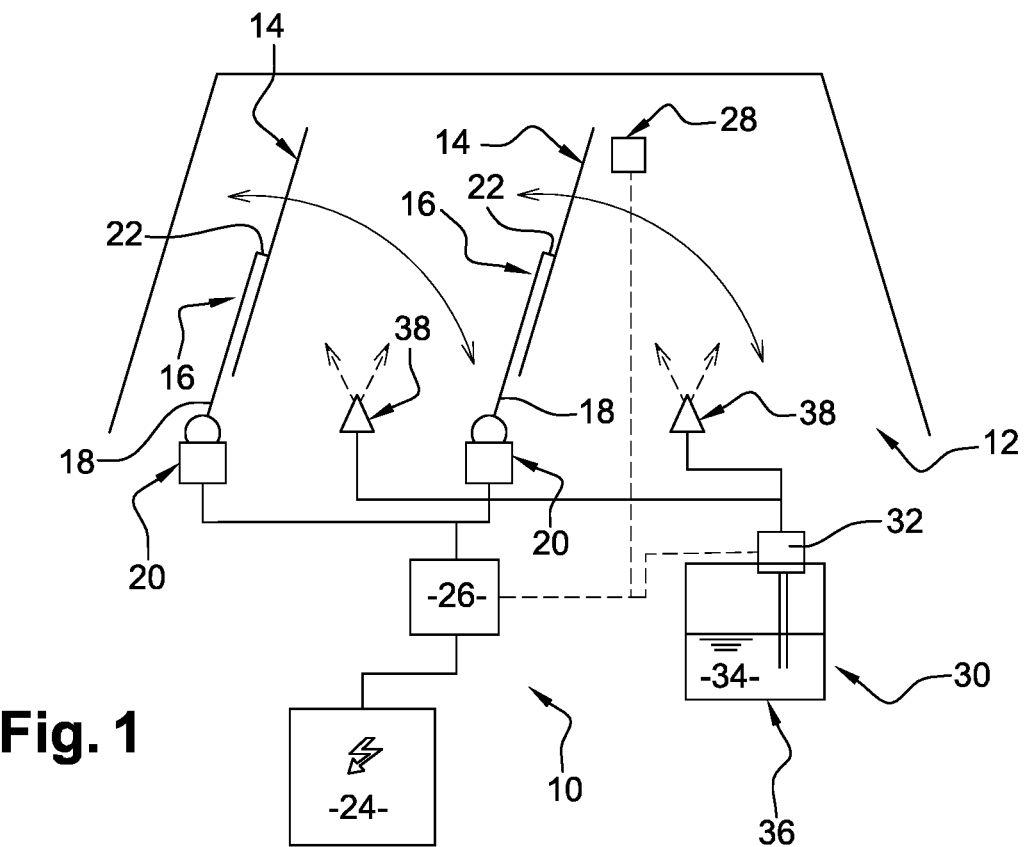
FIG. 1 is a schematic view of a wiping system for a vehicle windshield of which the wipers are represented in their so-called service position.
Figure 2:
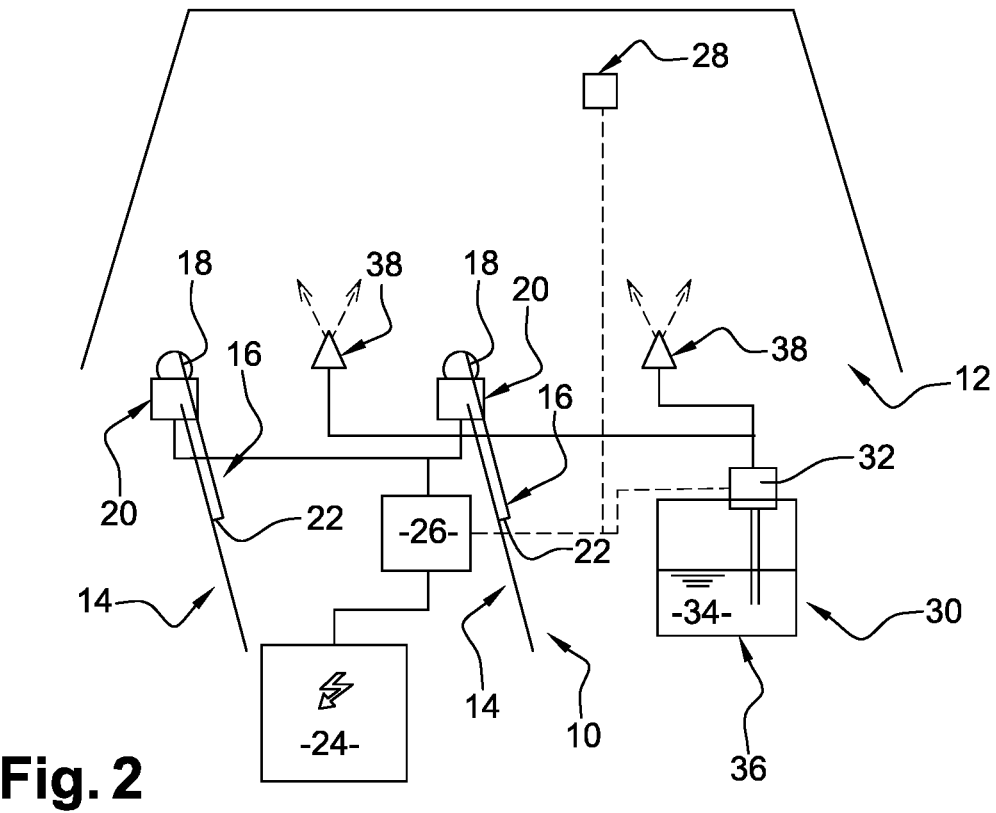
FIG. 2 is a view analogous to that of FIG. 1, in which the wipers are represented in their so-called maintenance position.

FIGS. 1 and 2 depict a system 10 for wiping a window 12 of a motor vehicle, which is here a windshield of the vehicle.

The wiping system 10 here comprises two wipers 14. Each wiper 14 is carried by a wiper carrier 16, also commonly referred to as wiper arm or drive arm.

In an alternative manner, not represented in detail, each wiper 14 comprises at least one wiper blade which is a flexible strip of natural or synthetic elastomer material of which a lower edge of longitudinal orientation in the longitudinal general direction of the wiper 14 cooperates with the outer surface of the windshield 12 in order to clean and/or wipe the latter.

A proximal end 18 of each wiper carrier 16 is connected to a drive motor 20, whereas a distal end 22 of each wiper carrier 16 is connected to the wiper 14 which it carries.

Each drive motor 20 is designed to drive the wiper carrier 16 to sweep in a back-and-forth pivoting movement, or cyclical rotational movement, along a circular arc portion about a pivot axis or axis of rotation whose general orientation is globally orthogonal to the longitudinal general orientation of the wiper carrier 16.

According to one possible embodiment, each drive motor 20 comprises an output shaft (not shown) which transmits a drive torque, directly or for example via a linkage, to the associated wiper carrier 16.

Each drive motor 20 is, for example, an electric motor, and the drive motors 20 are connected to an electrical power source 24, such as, for example, a battery of accumulators of the vehicle, or an alternator.

Each drive motor 20 is connected to the electrical power source 24 by a unit 26 for the command and control of the wiping system 10.

The command and control unit 26 is in particular designed and configured to manage the operation of the wiping system 10 according to a plurality of predefined use programs, for example by controlling the rotational drive speed of the wiper carriers 16 by regulating the current supplied to the drive motors 20, for a given value of the supply voltage of the drive motors 20 which is provided by the electrical power source 24.

In a complementary and nonlimiting manner, the wiping system 10 additionally comprises a rain sensor 28 which is connected to the command and control unit 26.

The wiping system 10 additionally comprises a device 30 for cleaning the outer surface of the windshield, which comprises a pump 32 which is connected to the command and control unit 26 and to the electrical power source 24, and which is designed to draw off washer liquid 34 from a reservoir 36 in order to feed it to means for spraying the liquid onto the outer surface of the windshield 12, these spraying means being, for example, nozzles 38 arranged on the hood of the motor vehicle or alternatively carried by the wipers 14 or alternatively by the wiper carrier 16.

According to one possible embodiment, each wiper carrier 16 is able to occupy a position, termed service position, or wiping use position, in which the wiping edge of the wiper blade of the wiper is in contact with the outer surface of the window to be wiped, in particular of the windshield.

In the service position of each wiper carrier 16, they can be driven to wipe cyclically back and forth by the drive motors 20.

Each wiper carrier 16 is also able to occupy, as illustrated schematically in FIG. 2, a position, termed maintenance position, in which the wiper carrier 16, and hence the wiper 14 which it carries, is moved away from the window, that is to say that the wiper blade is no longer in contact with the outer surface of the windshield.

The change in position of each wiper carrier between its use position and its maintenance position can for example be carried out manually by a user or an operator by tilting the wiper carrier 16 about an axis generally globally orthogonal to the longitudinal axis of the wiper carrier 16.

The movement of the wiper carrier can also be "motorized" and controlled from the cabin of the vehicle, as stated in the preamble, in particular to an intermediate position.

When a wiper carrier 16 is in its maintenance position as illustrated in FIG. 2, it is possible to gain access in particular to the wiper 14 in order to carry out a maintenance operation, such as, for example, a cleaning of the wiper blade.

More generally, the aim of placing a wiper carrier 16 and its associated wiper 14 into the maintenance position is to allow an operation for replacing the wiper or the wiper blade to be carried out.

Such a replacement operation occurs by demounting the used or damaged wiper and then by mounting a fresh new wiper or a new wiper blade on the wiper carrier 16.

In order to guarantee the highest degree of use safety of the vehicle and in particular the best visibility conditions through the window, here through the windshield 12, it is necessary that each wiper 14 is replaced with a fresh new wiper at the end of a determined wiping use quantity which, for a fresh wiper, corresponds for example to a number of wiping cycles.

The invention is aimed in particular at proposing a method making it possible, in a reliable manner, to determine the wiping use of a fresh wiper.

The method consists at first in acquiring at least one data item which is representative of the positioning of the wiper 14 in the maintenance position, that is to say here of the positioning, as illustrated in FIG. 2, of the associated wiper holder 16 in the maintenance position.

This first a) is necessary in order to be capable of determining the accomplishment of a wiper change operation, that is to say in particular the replacement of a used wiper with a fresh new wiper.

However, the positioning in the maintenance position does not necessarily imply either an operation of fitting a new wiper or that a fitted new wiper is a fresh wiper.

Specifically, for example, the positioning in the maintenance position may have been followed by a simple operation of cleaning the wiper blade.

Moreover, for example in the case of a wiping system comprising two wipers, the maintenance and intervention operations could have led to the replacement of only one of the two wipers with a fresh new wiper, whereas the other wiper remains unchanged.

By way of nonlimiting example, the acquisition of data representative of the presence of the wiper in the maintenance position consists in:
  i) measuring or estimating at least one parameter for determining the maintenance position or service position;
  ii) comparing the measured or estimated value of said parameter with a reference value or a range of reference values; and
  iii) determining, from the results of the comparison, if the wiper carrier is in the maintenance or service position.

The parameter is, for example, chosen from the electrical consumption of at least one motor 20 for driving the wiper carrier 16 to sweep back and forth, the output torque of the drive motor 20, the frictional torque of the wiper 14 on the windshield 12 and the coefficient of friction of the wiper on the windshield 12.

In accordance with the method according to the invention, the first step a) of acquiring a data item representative of the presence of the wiper in the maintenance position is followed by a step b) aimed at determining the replacement of a wiper with a new wiper, in particular with a fresh wiper, or even with a new wiper of which the prior wiping use is known.

This step b) of determining the replacement of the wiper with a new wiper is, for example, a step of emitting an interrogation message destined for a user of the vehicle and/or for a person tasked with the maintenance of the wiper.

The message can, for example, be addressed by display on a touchscreen, for example in the cabin of the vehicle, asking one or more questions relating to the operations actually carried out following the positioning of one or more wipers in the maintenance position.

For example, the driver or the person tasked with the maintenance is asked whether he or she has replaced a wiper with a fresh new wiper, replaced all the wipers, etc.

This interrogation can, for example, be carried out from the first starting of the vehicle subsequent to the operation on the wiping system.

The interrogation can also be transmitted and displayed on any remote communication apparatus available to the user or to a service center.

Assuming the response is: "No, the wiper has not been changed/replaced", a new question can be asked: "Why have you not changed/replaced the wiper?".

In order to determine if a fresh new wiper has been fitted, the coefficient of friction of the wiper on the window to be wiped is determined for example, directly or indirectly, and it is compared either with a stored reference value or with a previously determined value for the wiper that has just been demounted in order to replace it.

To this end, the step b) of determining the replacement of the wiper with a new wiper is a step of measuring the power consumption of the electric drive motor during the wiping use of the wiper 14 carried by the wiper carrier 16.

Subsequently, after determining the actual replacement of the wiper, the method according to the invention provides a step c) of estimating the wiping use of the new wiper.

After the fitting of a new wiper, in particular a fresh wiper, such an estimating step makes it possible to determine in a reliable manner the actual real wiping use, or an estimation of this use, of the new wiper, in particular with a view to determining in future the need to replace it again.

According to one aspect of the invention, the estimating step c) comprises a comparison of the wiping use of the new wiper with respect to a value of a wiping use threshold. Such a use threshold value is, for example, a determined wiping use limit value of a fresh wiper. This value is, for example, a total number of cycles counted from the first activation of the wiping system after the return of the wiper carrier(s) to the so-called service position.

When the predetermined threshold value is reached or exceeded, the method comprises a step d) of emitting a warning signal.

For example, the warning signal is an information signal destined for the owner or for the user of the vehicle, or else destined for the network of maintenance and service branches of the vehicle manufacturer, with a view to replacing the used wiper(s) with fresh wipers.

The warning signal can, for example, be displayed in the cabin of the vehicle during the starting of the vehicle.

The display and/or the transmission of the warning signal can be reiterated regularly, for example on a regular basis, until the method determines that a replacement of the wipers has been carried out, in particular by implementing the steps a) and b) of the method.

The warning signal can also be transmitted and displayed on any remote communication apparatus available to the user or to a service center.

The warning signal can also comprise additional technical and commercial information relating in particular to the model, type and reference of fresh wiper to be used, in particular insofar as the method provides for the use of a threshold value or threshold values which is or are directly associated with the model, type and reference of fresh wiper recommended for its mounting on the vehicle.

The invention claimed is:

1. A method for determining wiping use of a wiper of a wiping system for a motor vehicle window, with a view to replacing the wiper once a wiping use threshold is exceeded, the wiping system comprising:
  at least one wiper carried by a wiper carrier which is movable from a service position in which the wiper is in contact with an outer surface of the motor vehicle window to carry out wiping thereof by sweeping back and forth, to a maintenance position in which the wiper is not in contact with said outer surface of the motor vehicle window,
  the method successively comprising:
    acquiring, by a control unit, at least one data item which is representative of presence of the wiper in the maintenance position;
    determining, by the control unit, replacement of the wiper with a new wiper; and estimating, by the control unit, the wiping use of the new wiper, wherein determining the replacement of the wiper with the new wiper comprises emitting an interrogation message destined for a user of the motor vehicle and/or for a person tasked with the maintenance of the wiper.

2. The method as claimed in claim 1, wherein the estimating comprises comparing, by the control unit, the wiping use of the new wiper with respect to the wiping use threshold.

3. The method as claimed in claim 2, wherein the wiping use threshold is a determined use limit value of the new wiper.

4. The method as claimed in claim 2, wherein the estimating is followed by emitting, by the control unit, a warning signal when the wiping use of the new wiper is above said wiping use threshold.

5. The method as claimed in claim 4, wherein said warning signal is an information signal with a view to replacing the new wiper with another new wiper.

6. The method as claimed in claim 1, wherein said message is a message asking the user of the vehicle and/or the person tasked with the maintenance of the wiper if he or she has replaced the wiper with the new wiper.

7. The method as claimed in claim 1, in which said wiping system comprises at least one motor for driving the wiper carrier to sweep back and forth, wherein the determining of the replacement of the wiper with the new wiper comprises measuring, by the control unit, power consumption of said at least one motor during the wiping use of the wiper carried by the wiper carrier.

8. The method as claimed in claim 1, wherein said acquiring of the at least one data item representative of the presence of the wiper in the maintenance position comprises:

measuring, or estimating, by the control unit, at least one parameter for determining the maintenance position or service position;

comparing, by the control unit, a value of the measured, or estimated, said at least one parameter with a reference value or a range of reference values; and determining, by the control unit, from the results of the comparison, whether the wiper carrier is in the maintenance position or the service position.

9. The method as claimed in claim 8, wherein said at least one parameter is chosen from the group consisting of:

power consumption of at least one motor that drives the wiper carrier to sweep back and forth;

output torque of said motor;

frictional torque of the wiper on the motor vehicle window; and a coefficient of friction of the wiper on the motor vehicle window.

10. The method as claimed in claim 1, wherein the estimating of the wiping use of the new wiper comprises counting, by the control unit, a number of back-and-forth sweeping cycles carried out after said replacement of the wiper with the new wiper.

11. A wiping system for a motor vehicle window, comprising:

at least one wiper carried by a wiper carrier which is movable from a service position in which the wiper is in contact with an outer surface of the motor vehicle window to carry out wiping thereof by sweeping back and forth, to a maintenance position in which the wiper is not in contact with said outer surface of the motor vehicle window;

at least one motor for driving the wiper carrier to sweep back and forth; and a control unit that successively:

acquires at least one data item which is representative of presence of the wiper in the maintenance position, determines replacement of the wiper with a new wiper, and estimates a wiping use of the new wiper, wherein determining the replacement of the wiper with the new wiper comprises emitting an interrogation message destined for a user of the motor vehicle and/or for a person tasked with the maintenance of the wiper.

* * * * *